United States Patent
Blackmon

(10) Patent No.: US 6,813,219 B1
(45) Date of Patent: Nov. 2, 2004

(54) DECISION FEEDBACK EQUALIZATION PRE-PROCESSOR WITH TURBO EQUALIZER

(75) Inventor: Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/663,054

(22) Filed: Sep. 15, 2003

(51) Int. Cl.$^7$ ................................................. H04B 11/00
(52) U.S. Cl. ......................................................... 367/134
(58) Field of Search ........................... 367/134; 375/233

(56) References Cited

U.S. PATENT DOCUMENTS

| | | | | |
|---|---|---|---|---|
| 5,301,167 A | * | 4/1994 | Proakis et al. ............... | 367/134 |
| 2003/0048838 A1 | * | 3/2003 | Sexton et al. ................ | 375/229 |
| 2003/0214881 A1 | * | 11/2003 | Yang ........................... | 367/134 |

OTHER PUBLICATIONS

Blackmon et al.; Performance comparison of iterative/integral equalizer/decoder structures for underwater acoustic channels; Oceans, 2001. MTS/IEEE Conference and Exhibition, vol. 4 , Nov. 5–8, 2001; pp. :2191–2200 vol. 4.*

* cited by examiner

Primary Examiner—Daniel Pihulic
(74) Attorney, Agent, or Firm—James M. Kasischke; Michael F. Oglo; Jean-Paul A. Nasser

(57) ABSTRACT

The present invention provides a receiver for underwater acoustic telemetry which combines a decision feedback adaptive equalizer structure with a turbo-equalizer structure. The turbo-equalizer structure is of significantly reduced complexity because the decision feedback adaptive equalizer structure is operable to pre-process a plurality of data channels to provide a single symbol data output stream for application to the input of the turbo-equalizer. The turbo-equalizer structure is also of reduced complexity due to use of a correlator to provide channel response data to the turbo-equalizer. The channel response data is produced by comparing received data comprising a training sequence with a locally produced training sequence.

14 Claims, 2 Drawing Sheets

DECISION FEEDBACK EQUALIZATION PRE-PROCESSOR WITH TURBO EQUALIZER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to communications systems and, more particularly, to a high performance iterative and adaptive equalizer/error correction decoder (turbo-equalization) which is especially suitable for use in underwater telemetry.

(2) Description of the Prior Art

The underwater environment provides numerous difficult obstacles for acoustic communications. The ocean acoustic channel produces large amplitude and phase fluctuations on acoustic signals transmitted therethrough causing temporal, spatial, and frequency dependent fluctuations. Multipath distortion is a significant problem. Underwater regions often experience high and/or variable sound attenuation. Ambient ocean-noise influences the received signal-to-noise ratio and may require high transmission power levels to achieve suitable ratios depending on the conditions.

Presently utilized underwater coherent acoustic telemetry systems are often able to transmit M-ary Phase Shift Keying (MPSK) and M-ary Quadrature Amplitude Modulation (MQAM) signals. At the receiver end, these coherent signals may be processed by an adaptive multi-channel decision feedback equalizer (DFE). The DFE is then usually followed by a de-interleaver and an error correction decoder. The overall performance obtained by this type of prior art underwater telemetry system is often acceptable, but is not satisfactory in many situations. The desire for performance improvement has led to higher performance algorithms whose complexity is orders of magnitude greater than the standard decision feedback equalizer (DFE) system followed by de-interleaving and decoding.

Turbo equalization and turbo coding may be applied to many detection and decoding problems. Turbo coding involves concatenation of simple component codes with an interleaver so that decoding can be performed in steps using algorithms of manageable complexity. However, the complexity of prior art turbo equalization increases exponentially with the number of channels and/or other factors, thereby making a multi-channel telemetry system, as is typically utilized in underwater telemetry systems, highly complex. More particularly, the complexity of the prior art turbo-equalizer grows with channel complexity, modulation level, and spatial and/or time diversity. The complexity of a prior art turbo-equalizer is therefore orders of magnitude greater than the typical DFE structure discussed above.

The following U.S. Patents describe various prior art systems that may be related to the above and/or other telemetry systems:

U.S. Pat. No. 5,301,167, issued Apr. 5, 1994, to Proakis et al., discloses an underwater acoustic communications system that utilizes phase coherent modulation and demodulation in which high data rates are achieved through the use of rapid Doppler removal, a specialized sample timing control technique and decision feedback equalization including feedforward and feedback equalizers. The combined use of these techniques dramatically increases data rates by one and sometimes two orders of magnitude over traditional FSK systems by successfully combating fading and multipath problems associated with a rapidly changing underwater acoustic channel that produce intersymbol interference and makes timing optimization for the sampling of incoming data impossible.

U.S. Pat. No. 5,559,757, issued Sep. 24, 1996, to Catipovic et al., discloses an underwater acoustic telemetry system that uses spatially distributed receivers with aperture sizes from 0.35 to 20 m. Output from each receiver is assigned a quality measure based on the estimated error rate, and the data, weighted by the quality measure, is combined and decoded. The quality measure is derived from a Viterbi error-correction decoder operating on each receiver. The quality estimator exploits the signal and noise differential travel times to individual sensors. The spatial coherence structure of the shallow-water acoustic channel shows relatively low signal coherence at separations as short as 0.35 m. Increasing receiver spacing beyond 5 m offers additional benefits in the presence of impulsive noise and larger scale inhomogeneities in the acoustic field. Diversity combining, even with only two receivers, can lower uncoded error rates by up to several orders of magnitude while providing immunity to transducer jamming or failure.

U.S. Pat. No. 6,295,312 B1, issued Sep. 25, 2001, to Susan M. Jarvis, discloses a method and system for communicating in a time-varying medium. A transmitter sends transmissions of the same message data separated in time with respect to one another. A single sensor receives the transmissions. Each received transmission is buffered until all of the transmissions that were sent are received. The buffered transmissions are simultaneously processed via multichannel adaptive equalization only when all of the transmissions that were sent are received.

The above cited prior art does not disclose a system whose complexity is similar to that of the prior art decision feedback equalizer followed by a de-interleaver and an error correction decoder, but whose performance is comparable to telemetry systems with much higher orders of complexity. The above cited prior art also does not disclose lower complexity, better performing telemetry system which lowers the complexity associated with turbo-equalization. The solutions to the above described and/or related problems have been long sought without success. Consequently, those skilled in the art will appreciate the present invention that addresses the above and other problems.

SUMMARY OF THE INVENTION

It is a general purpose of the present invention to provide an improved telemetry system.

An object of the present invention is an improved underwater communication system for coherent signal transmission.

Another object of the present invention is to combine the desirable features of an adaptive feedback equalization (DFE) system with features of a turbo-equalization structure.

Yet another object is to provide an augmented high performance iterative receiver algorithm for underwater acoustic telemetry.

A feature of one embodiment of the invention combines a decision feedback adaptive equalizer (DFE) with a turbo-equalizer whereby the decision feedback equalizer or variant thereof provides a pre-processing stage for a turbo-equalizer that significantly limits the complexity of the turbo-equalizer.

An advantage of the present invention is superior performance as compared to the standard DFE structure.

Another advantage is that time or spatial signal diversity can be processed with low complexity within the DFE to provide a single stream of diversity combined symbols which can be processed with a simplified turbo-equalizer construction for use in multichannel transmissions.

Yet another advantage of the present invention is that a DFE structure may be utilized therein to take advantage of fractional spacing to help synchronize symbols.

Yet another advantage of the present invention is that a DFE structure may be utilized to reduce the extent of the channel response and therefore allow a turbo-equalizer to operate on a much shorter impulse response in order to reduce the complexity thereof.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a coherent receiver which is operable for use in an underwater telemetry system or for other applications. A coherent receiver in accord with the present invention may comprise one or more elements such as, for instance, one or more data input channels connected to the coherent receiver, and/or a decision feedback equalizer for receiving the one or more data input channels and producing a single stream of pre-processed data at a decision feedback equalizer output, and/or a turbo-equalizer connected to the feedback equalizer output for receiving the single stream of preprocessed data.

The coherent receiver may further comprise a plurality of receiver transducers for producing spatially diverse data for the one or more input channels. Alternatively, the coherent receiver may also comprise a single receiver transducer for producing time diverse data for the one or more input channels. In this embodiment, the decision feedback equalizer may also be operable for selectively controlling the total number of the one or more input channels utilized based on error analysis of the diverse data.

The coherent receiver may further comprise a training symbol sequence generator and a correlator in communication with the training symbol sequence generator and the decision feedback equalizer wherein the output of the correlator is preferably receivable by the turbo-equalizer.

In a preferred embodiment, the turbo equalizer may further comprise an equalizer portion and a decoder portion interconnected for iterative operation. The equalizer portion and the decoder portion may each preferably utilize a maximum a posteriori probability (MAP) algorithm.

In operation, the invention comprises a method which may comprise one or more steps such as, for example only, detecting a received signal which may comprise a plurality of data channels, and/or pre-processing the plurality of data channels within a decision feedback equalizer to produce a single output stream of symbol data from the plurality of data channels, and/or post-processing the single output data stream within a single channel turbo-equalizer.

The post-processing of the single output data stream may further comprise iteratively equalizing and decoding data from the single output data stream to produce a corrected data output stream and may utilize the MAP algorithm for the steps of iteratively equalizing and decoding.

In one embodiment, the method may further comprise mitigating phase jitter in the single output data stream utilizing the decision feedback equalizer.

The method may further comprise providing that the received signal comprises a transmitted training symbol sequence, preprocessing the transmitted training symbol sequence to provide a pre-processed training sequence, producing a local training symbol sequence within the receiver, correlating the local training symbol sequence with the pre-processed training sequence to provide channel estimate, and utilizing the channel estimate within the turbo-equalizer.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing, wherein like reference numerals refer to like parts and wherein.

DESCRIPTION OF THE PREFERRED EMBODIMENT

The present invention provides an augmented high performance iterative receiver algorithm for underwater acoustic telemetry. While the prior art turbo-equalization techniques would have been very complex when used to handle underwater telemetry data, which typically comprises multiple channels, a receiver in accord with the present invention combines a decision feedback adaptive equalizer (DFE) with a turbo-equalizer to produce an improved receiver which has a complexity very close to that of a typical prior art DFE system.

Figure 2:
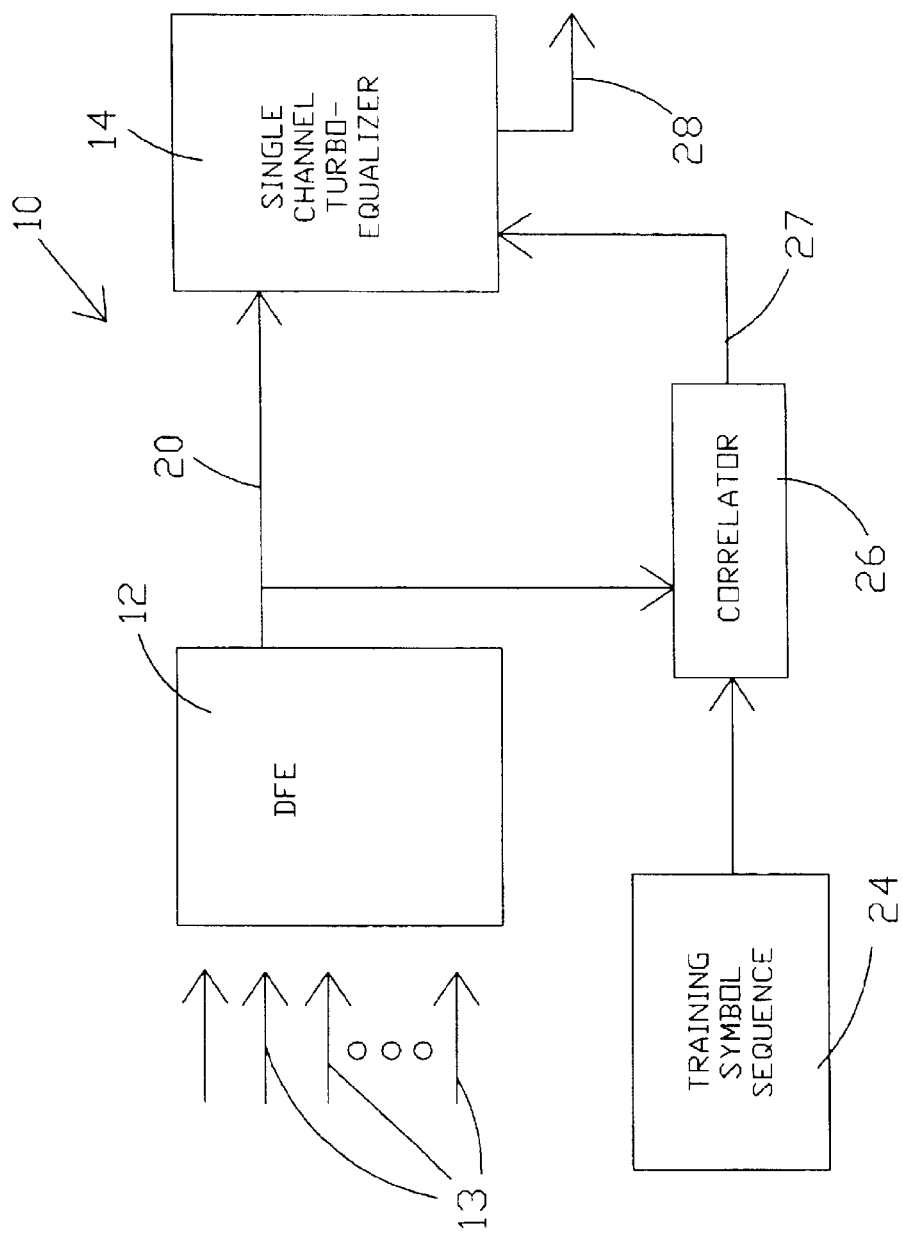
FIG. 2 is a block diagram schematic of a presently preferred DFE pre-processor followed by a reduced complexity turbo-equalizer in accord with the present invention.

Referring now to the drawings and, more particularly to FIG. 2, there is shown a block diagram schematic for receiver 10 in accord with the present invention. As described hereinbelow in more detail, decision feedback equalizer or variant 12 effectively serves as a pre-processor stage for turbo-equalizer 14 in a manner that greatly reduces the complexity for use of turbo-equalization techniques as applied to an underwater acoustic telemetry system with multiple channels. Multi-channel input data 13 may include data received from multiple channels such as, for example, spatially diverse data produced from plurality of transducers received from a single transducer but transmitted by a plurality of transducers. Multi-channel input data 13 may also comprise time diversity transmissions such as, for example, use of a single transmitter and/or single receiver wherein the same data is transmitted multiple times. In the case of the single receiver, due to multipath error, each transmission is affected differently by transmission through the underwater environment and when received is treated as a different channel. The multiple channels of data so produced may be processed simultaneously in the same manner as spatially diverse data received by multiple receivers. Alternately, data may be sent to the single receiver and repeated as necessary. Moreover, as discussed below, the data may be sent a selectable number of times so that the data is repeated only often enough for good reception thereby maximizing data transmission rates.

There are a number of advantages to the invention. The performance is superior to the prior art DFE structure, but the complexity is comparable. Moreover, many of the benefits of use of a DFE structure are available. Time or spatial diversity can be used with low complexity within the DFE to provide a single output stream of diversity combined symbols. Also, the DFE can take advantage of fractional spacing to help synchronize symbols. The DFE also reduces the extent of the channel response and therefore allows the turbo-equalizer to operate on a much shorter impulse response reducing the complexity.

In the past, the turbo principle of operation has been applied to concatenated codes and to many detection and decoding problems. The idea or principle of turbo coding is to build a strong code by concatenation of simple component codes with an interleaver so that decoding can be performed in steps using algorithms of manageable complexity. In turbo equalization, the channel with inter-symbol interference (ISI) including the transmitter and receiver filters might be regarded as a linear finite state machine, serially concatenated to the channel convolutional encoder. In most cases, a serially concatenated system with an interleaver consists of an outer code, an interleaver permuting the outer code words bits, and an inner finite state machine whose input words are the permuted outer code words. There are different examples for serially concatenated systems. One example of such a scheme is the concatenation of a channel encoder and a non-linear modulator with memory, say a continuous phase frequency-shift keying (CPFSK) modulator. Also, concatenation of a convolutional code and a channel with memory can be considered as a serially concatenated system and we may apply the iterative detection algorithms to this system. Iterative detection schemes are sub-optimum detection algorithms with limited complexity for these systems. The optimum decoding algorithms need a trellis with a huge number of states for which we should consider all system memory. For example, for a system with v memories in a convolutional encoder and with an ISI channel with M memories and an interleaver size N, the optimal decoding algorithms need a trellis with $2^{(v+M+N)}$ states. This potential complexity of a turbo equalizer for an underwater telemetry system is greatly reduced in accord with the teachings of the present invention.

Figure 1:
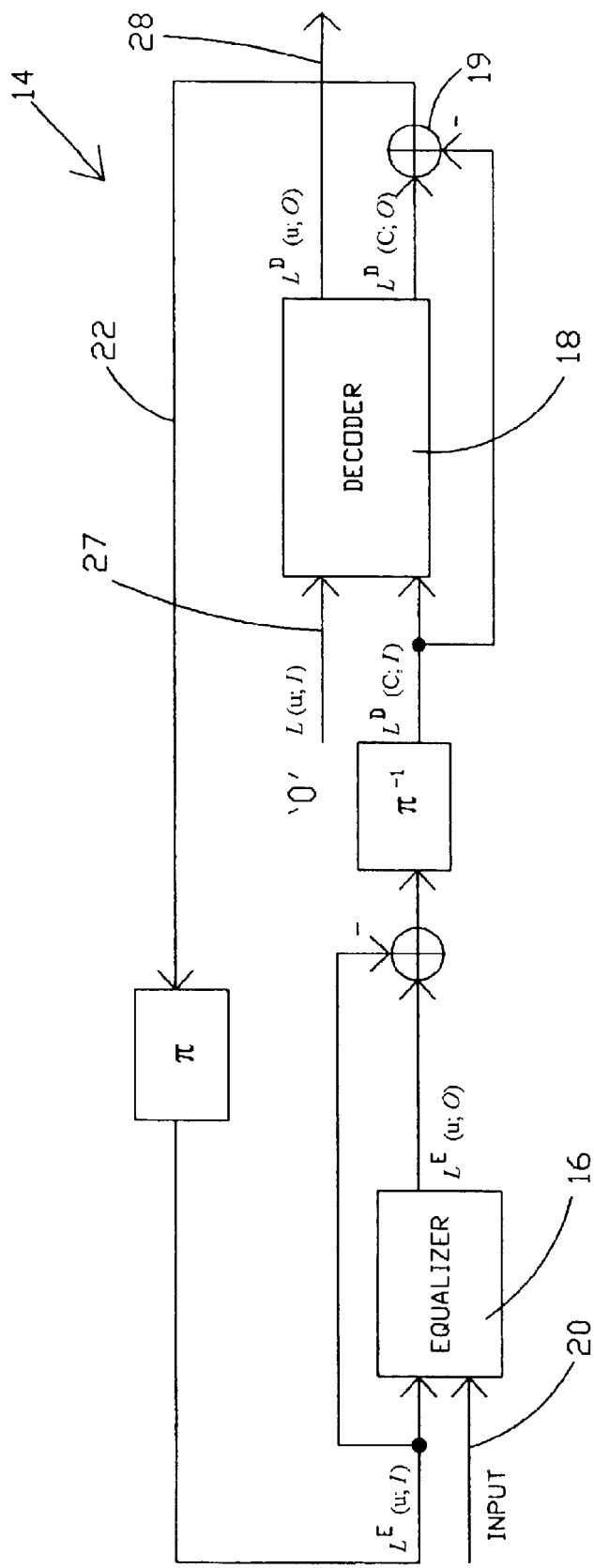
FIG. 1 is a block diagram schematic of a presently preferred turbo equalizer in accord with the present invention.

A block diagram schematic for one embodiment of turbo equalizer 14 which may be utilized in accord with the present invention is shown in FIG. 1. Preferably, soft-input soft output (SISO), maximum a posteriori probability (MAP), iterative algorithms are utilized for both channel equalization and decoding, i.e., MAP Equalizer 16 and MAP Decoder 18. Adaptive decision feedback equalizer (DFE) 12 acts as a pre-processor to pre-condition the symbol data which is passed on to turbo-equalizer 14 as indicated at 20. The multi-channel received input data (spatial and/or time diversity) is processed by adaptive decision feedback equalizer (DFE) 12 which also preferably uses a second order phase locked loop for phase jitter mitigation. DFE 12 thereby provides a single symbol stream at 20 given any number of received input channels. In this manner, the present invention thereby limits turbo-equalizer 14 to working on a single channel, thereby greatly reducing complexity.

Accordingly, in the system of FIG. 1 and FIG. 2, a sequence of synchronized phase compensated values are produced by DFE 12, as indicated at 20, as an input in turbo equalizer 14. MAP equalizer 16 delivers Log values $L^E(u;O)$ about coded bits. After de-interleaving, the channel MAP decoder delivers Log values $L^D(\hat{u})$ about information bits and Log values $L^D(c;O)$ about coded bits. Soft-values, preferably in the form of log-likelihood ratios (LLR) values, at the output of MAP decoder 18 consist of an extrinsic and an intrinsic part. The extrinsic part is the incremental information about the current bit obtained through the decoding process from all the other bits in the block. The extrinsic part can be calculated by subtraction of the LLR values as indicated at 19. The extrinsic part, as indicated at 22, is interleaved and fed back to MAP equalizer 16 where the extrinsic part is used as a priori information $L^E(u;I)$ in the new decoding iteration. In a preferred embodiment, the outputs as determined by the iterative processing, which may be hard outputs or soft outputs (which are easily converted to hard outputs), are produced at output 28.

DFE 12 also has sparsing capability. That is to say that time delayed multipath or channel effects are mitigated by DFE 12. Multipath mitigation has the effect of shortening the channel response and limiting the number of important contributing channel coefficients that need to be used by turbo-equalizer 14 thereby lowering complexity. Also, the data from the DFE 12 is fractionally spaced, i.e. 2 samples per symbol, which aids in symbol synchronization for turbo-equalizer 14. The second order phase locked loop structure in the DFE allows for phase jitter mitigation thereby removing the need for estimation of this error from turbo-equalizer 14.

The reduced channel estimate for the turbo-equalizer can be obtained by using correlator 26 to cross-correlate the training symbol sequence produced by generator 24 with the corresponding received output symbols from DFE 12 which are the received version of the same information. The reduced channel response at 27 is applied to turbo-equalizer 14.

Turbo-equalizer 14 is able to apply the iterative MAP equalization and iterative MAP decoding operating principles as discussed above to correct residual equalization symbol errors that still remain after DFE 12 which acts as a pre-processor stage in hard output 28.

One embodiment of the present invention may also be utilized to increase the data rate throughput of prior art time diversity receivers. The present invention is operable to utilize or increase/decrease the number of time diversity data channels, i.e., the number of times the data is resent, in response to analyzing the data packet errors. In this embodiment, if errors are present, only then a subsequent copy of the data packet is resent and/or the number of times the transmitter resends the data packet is controlled whereby the receiver combines the data using time diversity equalization as taught in the prior art discussed hereinbefore. If the data packets are error free, there is no need for additional time diversity or increased time diversity combining. Therefore, on average, the data rate can be increased beyond that possible with constant time diversity processing. In fact, the present invention may or may not be utilized with multichannel data depending on an ongoing analysis of data packet errors and then determining the number of channels required so that the transmitter produces repeated data packets only as needed to obtain accurate reception.

In summary, the performance improvement of receiver 10 is due to using the turbo-equalization technique to clean up residual error that is left behind by pre-processing performed by DFE 12. Time and/or spatial diversity can be used with low complexity within DFE 12 to provide a single stream of diversity combined symbols. Also, DFE 12 can take advantage of fractional spacing to help synchronize symbols. The use of outputs from DFE 12 for the training symbol sequence reduces the extent of the channel response and therefore allows turbo-equalizer 14 to operate on a much shorter impulse response thereby reducing the complexity. DFE 12 preferably utilizes a second order phase locked loop to mitigate channel induced phase jitter. This technique can be used to mitigate channel estimation error in turbo-equalizer 14. The new channel estimate for turbo-equalizer 14 may be provided by the correlation of the known training symbol sequence and DFE 12 unquantized symbol output.

Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A coherent receiver operable for use in an underwater telemetry system, comprising:

at least one data input channel connected to said coherent receiver;

a decision feedback equalizer for receiving said at least one data input channel and producing a single stream of pre-processed data at a decision feedback equalizer output; and a turbo-equalizer connected to said feedback equalizer output for receiving said single stream of preprocessed data.

2. The coherent receiver of claim 1 further comprising:

a training symbol sequence generator; and a correlator in communication with said training symbol sequence generator and said decision feedback equalizer, an output of said correlator being receivable by said turbo-equalizer.

3. The coherent receiver of claim 1 wherein said turbo equalizer-further comprises an equalizer portion and a decoder portion interconnected for iterative operation.

4. The coherent receiver of claim 3 wherein said equalizer portion and said decoder portion each utilize a MAP algorithm.

5. The coherent receiver of claim 1 further comprising a plurality of receiver transducers for producing spatially diverse data for said at least one input channel.

6. The coherent receiver of claim 1 further comprising a single receiver transducer for producing time diverse data for said at least one input channel.

7. The coherent receiver of claim 6 wherein said single receiver transducer includes a plurality of input channels and said decision feedback equalizer is operable for selectively controlling a total number of said input channels utilized by said decision feedback equalizer based on error analysis of said time diverse data.

8. A method for operation of a coherent telemetry system, said method comprising:

detecting a received signal comprising a plurality of data channels;

pre-processing said plurality of data channels within a decision feedback equalizer to produce a single output data stream from said plurality of data channels; and post-processing said single output data stream within a single channel turbo-equalizer.

9. The method of claim 8 wherein said post-processing of said single output data stream further comprises iteratively equalizing and decoding data from said single output data stream to produce a corrected data output stream.

10. The method of claim 9 further comprising utilizing a MAP algorithm for said steps of iteratively equalizing and decoding.

11. The method of claim 8 further comprising mitigating phase jitter in said single output data stream utilizing said decision feedback equalizer.

12. The method of claim 8 further comprising:

providing that said received signal further comprises a transmitted training symbol sequence;

pre-processing said transmitted training symbol sequence to provide a pre-processed training sequence;

producing a local training symbol sequence within said receiver;

correlating said local training symbol sequence with said pre-processed training sequence to provide a channel estimate; and utilizing said channel estimate within said turbo-equalizer.

13. The method of claim 8 further comprising providing that said received data further comprises time diversity data.

14. The method of claim 8 further comprising providing that said received data further comprises spatial diversity data.

* * * * *